(12) United States Patent
DeLine et al.

(10) Patent No.: US 9,015,674 B2
(45) Date of Patent: Apr. 21, 2015

(54) IDENTIFYING EXECUTION PATHS THAT SATISFY REACHABILITY QUERIES

(71) Applicant: Microsoft Corporation, Redmond, WA (US)

(72) Inventors: Robert DeLine, Seattle, WA (US); Mike Barnett, Seattle, WA (US); Akash Lal, Bangalore (IN); Shaz Qadeer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 13/629,605

(22) Filed: Sep. 28, 2012

(65) Prior Publication Data

US 2014/0096112 A1 Apr. 3, 2014

(51) Int. Cl.
*G06F 9/44* (2006.01)
*G06F 11/36* (2006.01)

(52) U.S. Cl.
CPC .................................. *G06F 11/3608* (2013.01)

(58) Field of Classification Search
None
See application file for complete search history.

(56) References Cited

U.S. PATENT DOCUMENTS

| | | | |
|---|---|---|---|
| 7,110,936 B2 * | 9/2006 | Hiew et al. | 703/22 |
| 7,500,232 B2 * | 3/2009 | Das et al. | 717/154 |
| 7,555,418 B1 * | 6/2009 | Qadeer et al. | 703/22 |
| 7,584,455 B2 * | 9/2009 | Ball | 717/126 |
| 7,596,778 B2 * | 9/2009 | Kolawa et al. | 717/126 |
| 7,779,382 B2 * | 8/2010 | Rehof et al. | 717/126 |
| 7,844,953 B2 * | 11/2010 | Morizawa et al. | 717/126 |
| 8,131,768 B2 | 3/2012 | Sinha | |
| 8,171,438 B2 | 5/2012 | Ward | |
| 8,316,345 B2 * | 11/2012 | Gulwani et al. | 717/104 |
| 8,793,665 B2 * | 7/2014 | Murthy | 717/132 |
| 8,863,096 B1 * | 10/2014 | Bucur et al. | 717/126 |
| 2003/0226060 A1 | 12/2003 | Das et al. | |
| 2005/0060691 A1 * | 3/2005 | Das et al. | 717/132 |
| 2006/0130010 A1 * | 6/2006 | Rehof et al. | 717/136 |
| 2009/0125976 A1 * | 5/2009 | Wassermann et al. | 717/131 |
| 2009/0204968 A1 * | 8/2009 | Kahlon et al. | 718/100 |
| 2009/0249307 A1 * | 10/2009 | Yoshida | 717/131 |
| 2009/0292941 A1 | 11/2009 | Ganai et al. | |
| 2010/0005454 A1 | 1/2010 | Sankaranarayanan et al. | |
| 2010/0251221 A1 * | 9/2010 | Nori et al. | 717/131 |
| 2011/0022551 A1 * | 1/2011 | Dixon | 717/131 |
| 2011/0161937 A1 * | 6/2011 | Bounimova et al. | 717/131 |
| 2011/0271258 A1 * | 11/2011 | Park et al. | 717/131 |
| 2012/0159452 A1 | 6/2012 | DeLine et al. | |
| 2013/0055208 A1 * | 2/2013 | Murthy | 717/126 |

(Continued)

OTHER PUBLICATIONS

Beyer, et al., "An Eclipse Plug-in for Model Checking"; 2004 IEEE; [retrieved on May 8, 2014]; Retrieved from Internet <URL: https://bearspace.baylor.edu/Paul_Grabow/public/CPS_refs/DiscreteTools/EclipsePluginForModelChecking.pdf>;pp. 1-5.*

(Continued)

*Primary Examiner* — Xi D Chen
(74) *Attorney, Agent, or Firm* — Gregg Wisdom; Judy Yee; Micky Minhas

(57) ABSTRACT

Various technologies pertaining to answering reachability queries are described herein. A reachability query includes a user-specified destination line of code in source code that is desirably analyzed. A theorem prover is employed to identify an execution path through the source code that reaches the destination line of code. Graphical data is presented to the user that illustrates to the user the execution path through the source code that reaches the destination line of code.

20 Claims, 9 Drawing Sheets

(56) References Cited

U.S. PATENT DOCUMENTS

| | | | |
|---|---|---|---|
| 2013/0055209 A1* | 2/2013 | Murthy | 717/126 |
| 2013/0055220 A1* | 2/2013 | Murthy | 717/132 |
| 2013/0055221 A1* | 2/2013 | Murthy et al. | 717/132 |
| 2013/0239093 A1* | 9/2013 | Nori et al. | 717/126 |

OTHER PUBLICATIONS

Beyer, et al., "The BLAST Query Language for Software Verification"; 2004 Springer-Verlag Berlin Heidelberg; [retrieved on May 8, 2014]; Retrieved from Internet <URL: https://link.springer.com/chapter/10.1007/978-3-540-27864-1_2>;pp. 2-18.*

Zhang, et al., "Retaining All the Path Information for Graph Reachability Queries Based on Regular Expressions"; 2013 IEEE; [retrieved on Dec. 15, 2014]; Retrieved from Internet <URL:http://ieeexplore.ieee.org/stamp/stamp.jsp?tp=&arnumber=6816303>;pp. 799-804.*

Hasanzadeh, Najhihzadch, "GRU:Efficient Reachability Answering for Large Graphs Using United Interval Labeling"; 2012 IEEE; [retrieved on Dec. 15, 2014]; Retrieved from Internet <URL:http://ieeexplore.ieee.org/stamp/stamp.jsp?tp=&arnumber=6514365>;pp. 1011-1017.*

Nguyen-Van, et al., "Minimizing Data Transfers for Regular Reachability Queries on Distributed Graphs"; 2013 ACM; [retrieved on Dec. 15, 2014]; Retrieved from Internet <URL:http://dl.acm.org/citation.cfm?id=2542050.2542092>;pp. 325-334.*

Fionda, Pirro, "Querying Graphs with Preferences" 2013 ACM; [retrieved on Dec. 15, 2014]; Retrieved from Internet <URL:http://dl.acm.org/citation.cfm?id=2505515.2505758>;pp. 929-938.*

Veanes, et al., "An SMT Approach to Bounded Reachability", Retrieved at <<http://research.microsoft.com/pubs/77640/mpc.pdf>>, Proceedings of In Formal Techniques for Networked and Distributed Systems vol. 5048 of Lecture Notes in Computer Science, Jun. 10, 2008, pp. 1-16.

Ma, et al., "Directed Symbolic Execution", Retrieved at <<http://www.cs.umd.edu/~jfoster/papers/sas11.pdf>>, Proceedings of the 18th international conference on Static analysis, Retrieved Date: Sep. 14, 2011, pp. 1-17.

Barnett, et al., "Boogie: A Modular Reusable Verifier for Object-Oriented Programs", Retrieved at <<http://research.microsoft.com/en-us/um/people/leino/papers/krml160.pdf>>, In Proceedings of the 4th International Conference on Formal Methods for Components and Objects, Nov. 1, 2005, pp. 1-24.

Bragdon, et al, "Code Bubbles: Rethinking the User Interface Paradigm of Integrated Development Environments", Retrieved at <<http://citeseerx.ist.psu.edu/viewdoc/download?doi=10.1.1.180.4252&rep=rep1&type=pdf>>, In Proceedings of the 32nd ACM/IEEE International Conference on Software Engineering, vol. 1, May 2, 2010, pp. 1-10.

DeLine, et al., "Debugger Canvas: Industrial Experience with the Code Bubbles Paradigm", Retrieved at <<http://ieeexplore.ieee.org/stamp/stamp.jsp?arnumber=06227113>>, In 34th International Conference on Software Engineering, Jun. 2, 2012, pp. 1-10.

Ko, et al., "Information Needs in Collocated Software Development Teams", Retrieved at <<http://research.microsoft.com/en-us/um/redmond/groups/hip/papers/ko2007bugfixing.pdf>>, In Proceedings of the 29th International Conference on Software Engineering, May 2007, pp. 1-10.

Ko, et al., "Debugging Reinvented: Asking and Answering Why and Why not Questions About Program Behavior", Retrieved at <<http://citeseerx.ist.psu.edu/viewdoc/download?doi=10.1.1.159.1425&rep=rep1&type=pdf>>, In Proceedings of the 30th International Conference on Software Engineering, May 10, 2008, pp. 1-10.

Lal, et al., "Corral: A Whole-Program Analyzer for Boogie", Retrieved at <<http://research.microsoft.com/en-us/um/people/moskal/boogie2011/boogie2011_pg78.pdf>>, Retrieved Date: Aug. 27, 2012, pp. 1-13.

Lal, et al., "Corral: A Solver for Reachability Modulo Theories", Retrieved at <<http://research.microsoft.com/pubs/148752/techreport.pdf>>, In Technical Report MSR-TR-2012-09, Jan. 2012, pp. 1-22.

Latoza, et al., "Developers Ask Reachability Questions", Retrieved at <<http://citeseerx.ist.psu.edu/viewdoc/download;jsessionid=8FFC8637C58D4A6872857E17D6CFBB50?doi=10.1.1.205.9162&rep=rep1&type=pdf>>, In Proceedings of the 32nd ACM/IEEE International Conference on Software Engineering, vol. 1, May 2, 2010, pp. 1-10.

Latoza, et al., "Visualizing Call Graphs", Retrieved at <<http://www.cs.cmu.edu/~NatProg/papers/Paper3_LaTozaAndMyers_paper.pdf>>, In IEEE Symposium on Visual Languages and Human-Centric Computing, Sep. 18, 2011, pp. 1-8.

Leino, K. Rustan M., "This is Boogie 2", Retrieved at <<http://research.microsoft.com/en-us/um/people/leino/papers/krml178.pdf>>, Jun. 24, 2008, pp. 1-52.

Leino, et al., "A Polymorphic Intermediate Verification Language: Design and Logical Encoding", Retrieved at <<http://research.microsoft.com/en-us/um/people/leino/papers/krml199.pdf>>, In Proceedings of the 16th International Conference on Tools and Algorithms for the Construction and Analysis of Systems, Mar. 20, 2010, pp. 1-15.

Sillito, et al., "Questions Programmers Ask During Software Evolution Tasks", Retrieved at http://pages.cpsc.ucalgary.ca/~sillito/work/fse2006.pdf>>, In Proceedings of the 14th ACM SIGSOFT International Symposium on Foundations of Software Engineering, Nov. 5, 2006, pp. 1-11.

Tip, Frank, "A Survey of Program Slicing Techniques", Retrieved at <<http://citeseerx.ist.psu.edu/viewdoc/download?doi=10.1.1.93.5469&rep=rep1&type=pdf>>, In Journal of Programming Languages, vol. 3, Retrieved Date: Aug. 27, 2012, pp. 1-65.

Weiser, "Programmers Use Slicing When Debugging", Retrieved at <<http://citeseerx.ist.psu.edu/viewdoc/download?doi=10.1.1.136.9454&rep=rep1&type=pdf>>, In Magazine of Communications of the ACM, vol. 25, Issue 7, Jul. 1982, pp. 1-7.

Zeller, "Yesterday, My Program Worked, Today, It Does Not Why?", Retrieved at <<http://reference.kfupm.edu.sa/content/y/e/yesterday_my_program_worked_today_it_d_889513.pdf>>, In Newsletter of ACM SIGSOFT Software Engineering Notes, vol. 24, Issue 6, Nov. 1999, pp. 1-15.

* cited by examiner

```
c:\> findexecution /line:1
/condition:x==2 /line:5 /line:12
/condition:p==null program.exe
```

IDENTIFYING EXECUTION PATHS THAT SATISFY REACHABILITY QUERIES

BACKGROUND

Source code generated by developers during the course of a software project can often be quite lengthy and complex. For instance, source code pertaining to an operating system can include hundreds of thousands to millions of lines of code. During the software development process, developers will generate source code, test the source code for bugs, fix such bugs with the use of a debugger, etc. It is well known that oftentimes complex software will include many different branches, such that depending upon values of variables in the source code different branches may be taken during execution of the software.

Accordingly, software developers frequently have questions about software projects upon which they are working. Among some of the most difficult and time consuming of these questions are related to actual execution behavior of the software. For instance, a developer may wonder if a particular line of code is ever executed and, if it is executed, what branches were taken to reach such line of code. Oftentimes, during execution of a particular piece of software values are assigned to variables that were unintended or unexpected by the developer.

Conventionally, to monitor software execution behavior, developers typically have conversations with their colleagues or co-developers, manually inspect log data pertaining to software execution, or attempt to use a breakpoint debugger to drive the execution of the software to a particular line of code. As mentioned above, however, many current software projects include a significant number of lines of code, and thus answering any of the questions described above can be an error prone, time consuming, and frustrating process for the developer.

SUMMARY

The following is a brief summary of subject matter that is described in greater detail herein. This summary is not intended to be limiting as to the scope of the claims.

Described herein are various technologies pertaining to answering a reachability question with respect to source code set forth by a user (who may be a software developer that is responsible for the source code). The source code can be written in any suitable language, including C, C#, and the like. The reachability query set forth by the user can include a user-selection of a destination line of code, wherein the user wishes to be provided with an execution path through the source code that reaches the destination line of code. The user can set forth the reachability query in several possible manners; in an exemplary embodiment, the user, through utilization of a pointing mechanism such as a mouse or touch sensitive display screen, can select a particular line of code in the source code and indicate that such line of code is the destination line of code. Responsive to receiving the reachability query, a theorem prover can identify an execution path through the source code that results in reaching such destination line of code. In such an embodiment, the reachability query can be specified, for instance, in an integrated development environment.

In another exemplary embodiment, the developer may be employing a command line interface and can issue a reachability query, for instance, through utilization of a natural language query or a Boolean query. Pursuant to an example, the command line interface can be configured to support reachability queries that include a specification as to the destination line of code. Again a theorem prover can be utilized to identify an execution path through the source code that reaches the destination line of code.

In another exemplary embodiment, the reachability query can include other user-selected lines of code in the source code, which can include an initial line of code where execution of a program is desired to begin and at least one intermediate line of code through which execution of the program is desired to pass prior to reaching the destination line of code. Thus, the user, in the reachability query, can ask whether an execution path exists through the source code that begins at the initial line of code, passes through the at least one intermediate line of code, and subsequently reaches the destination line of code. An answer to the reachability query is an execution path that satisfies the conditions set forth in the reachability query (e.g., an execution path that begins at the initial line of code, passes through the at least one intermediate line of code, and thereafter reaches the destination line of code). Accordingly, the user can set forth a sequence of lines of code to identify an execution path through the code when executed by a computer processor that follows the sequence set forth by the user. An answer to the reachability query can also include identification of values of variables that cause the execution path to be taken during program execution.

An answer to the reachability query can be provided to a display screen of a computing device in the form of graphical data. Such graphical data can include a representation of the execution path that reaches the user-specified destination line of code. For example, the graphical data can include a graphical representation of a method executed at a beginning of the execution path, methods called in the execution path, and graphical data indicating an order that methods were called until the destination line of code is reached in the execution path. Further, particular lines of code executed in such execution path can be highlighted to inform the user of precisely which lines of code have been executed in the execution path. Moreover, values of one or more variables set forth in the source code that cause the execution the destination line of code to be reached can be displayed to the user.

Other aspects will be appreciated upon reading and understanding the attached figures and description.

BRIEF DESCRIPTION OF THE DRAWINGS

FIG. 8 is another exemplary graphical user-interface that indicates an execution path taken through source code that satisfies a reachability query set forth by a user.

DETAILED DESCRIPTION

Figure 1:
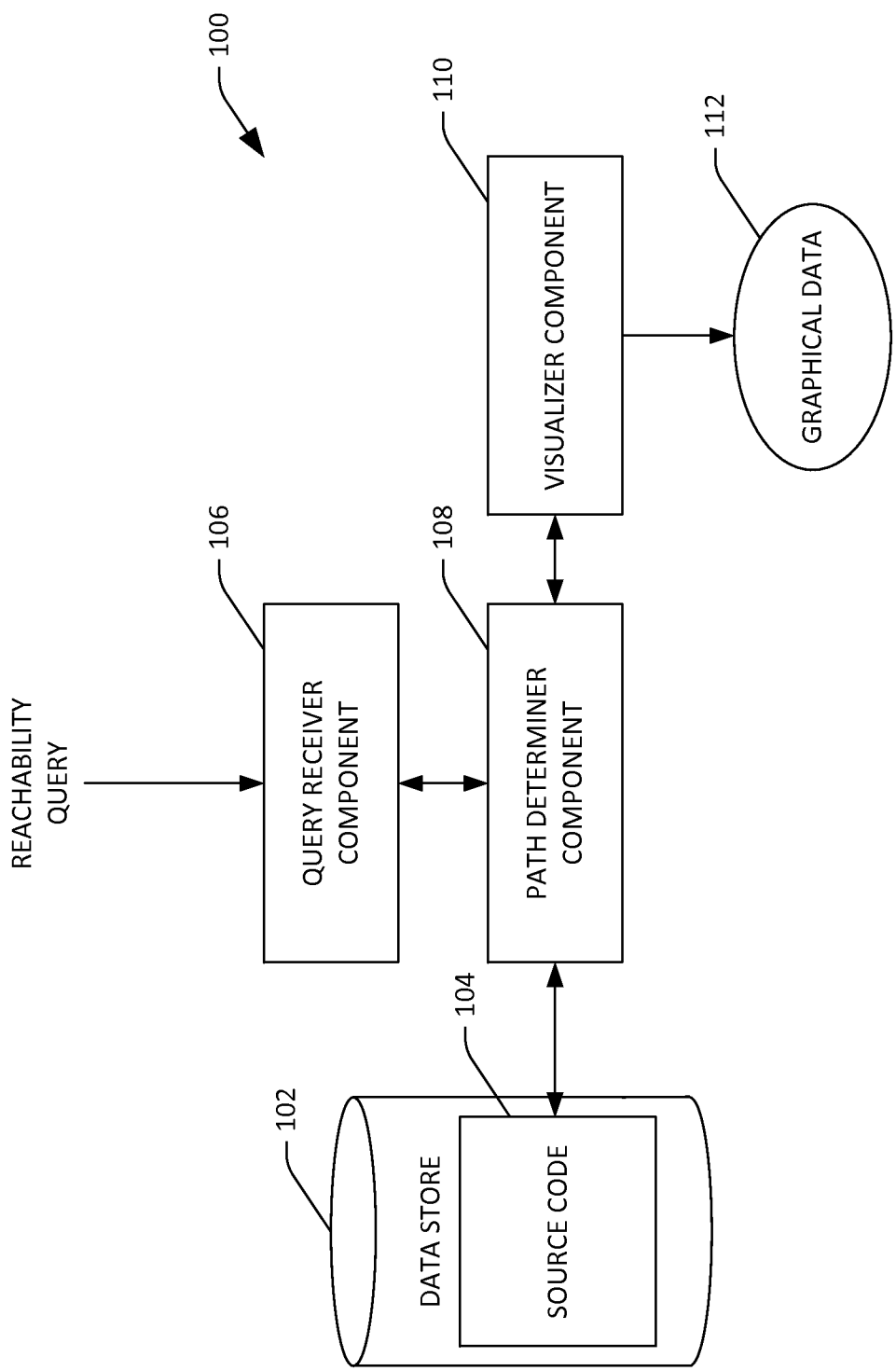
FIG. 1 is a functional block diagram of an exemplary system that facilitates answering a reachability query set forth by a user with respect to a computer-executable program.

Various technologies pertaining to answering reachability queries will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates answering a reachability query set forth by a user with respect to a computer-executable program (or a portion thereof) is illustrated. A reachability query represents a question set forth by a user as to how a particular line of a program is reached during execution of such program, while considering user-imposed constraints, such as intermediate execution points, constraints on variable values, and the like. The system 100 includes a data store 102, which can be or include a memory, a hard drive, a flash drive, or other suitable computer-readable data storage device. The data store 102 comprises source code 104 written by a developer or group of developers. The source code 104 can be written in any suitable programming language, including but not limited to C, C#, or the like. Further, the source code 104 can include a plurality of lines of code, such as between ten lines of code and several million lines of code. For example, the source code 104 can be a portion of a relatively large computer-executable program, such as an operating system, a word processing program, a spreadsheet program, an e-mail program, or the like. In an exemplary embodiment, the plurality of lines of code comprise between ten thousand lines of code and one hundred thousand lines of code. The source code 104 comprises numerous branches, such that several (possibly infinite) potential execution paths exist through the source code 104. The source code 104 further comprises several variables, wherein an execution path taken during execution of the computer-executable program is based upon values for the variables.

The system 100 further comprises a query receiver component 106 that receives a reachability query set forth by a user that is interested in at least a portion of the source code 104. For example, the user can be a developer of the source code 104. Oftentimes, due to relatively large size of source code and complexity thereof (particularly in settings where multiple developers are working on the source code 104), a developer may lack understanding as to how the computer executable program reaches a certain line of code or a certain program state. Accordingly, the reachability query set forth by the user, as indicated above, comprises a user-selected destination line of code, wherein the user constructs the reachability query to ascertain whether the destination line of code is reachable during execution of a computer-executable program that is based upon such source code 104, and to further ascertain what causes the destination line of code to be reached. Additionally, the user can set forth additional constraints in the reachability query.

Pursuant to an example, the user can set forth an initial line of code in the source code 104 and variable values corresponding thereto; thus, the reachability query is constructed by the user to determine whether and under what circumstances (e.g., what values are assigned to variables) the computer-executable program, during a possible execution thereof by a computer processor, starts at the initial line of code (with variable values defined in the reachability query) and reaches the destination line of code. In another exemplary embodiment, the user can specify an intermediate line of code of the source code 104 in the reachability query. In such an embodiment, the user constructs the reachability query to ascertain whether an execution path exists that passes through the intermediate line of code (e.g., from the initial line of code) and thereafter reaches the user-specified destination line of code. It is to be understood that the user can specify multiple intermediate lines of code, such that an execution sequence is specified in the reachability query. Moreover, the user can specify other constraints in the reachability query, such as discrete values of variables or ranges of variable values in the source code 104. For instance, the user can specify the destination line of code in the source code 104 and then set forth a constraint for a particular variable, thereby constructing the reachability query to determine whether the computer executable program can reach the destination line of code when the variable is constrained to the value specified by the user.

The system 100 further comprises a path determiner component 108 that is in communication with the query receiver component 106. Responsive to the query receiver component 106 receiving the reachability query, the path determiner component 108 identifies an execution path in the source code 104 from amongst the plurality of potential execution paths that satisfies the constraints set forth by the user in the reachability query. For instance, the path determiner component 108 can identify an execution path that reaches the destination line of code specified by the user in the reachability query. Additionally, the path determiner component 108 can identify values of variables that cause such execution path to be taken in the source code 104. As will be described in greater detail below, the path determiner component 108 can undertake a global analysis of the source code 104 when identifying the execution path that satisfies the constraints in the reachability query. With more specificity, the path determiner component 108 can employ a theorem prover in connection with identifying the execution path through the source code 104 that satisfies the reachability query set forth by the user. The theorem prover can be configured to output a counter-example to an assertion, wherein the counter-example is indicative of an execution trace that satisfies the reachability query.

The system 100 additionally comprises a visualizer component 110 that is in communication with the path determiner component 108. The visualizer component 110 generates graphical data 112 for display on a display screen of a computing device, wherein the graphical data is based at least in part upon the trace generated by the path determiner component 108. The graphical data 112 graphically depicts the execution path that satisfies the reachability query and the value of at least one variable that causes the execution path to be taken through the source code 104. As will be shown in greater detail below, the graphical data 112 generated by the visualizer component 110 can graphically depict methods called in the execution path, sequence of methods called in the execution path that causes the destination line of code (and other constraints in the reachability query) to be met, amongst other information. For instance, the graphical data 112 can be a graphical user interface that depicts respective methods called in the execution path, graphically indicates which lines of code were executed in the methods called, graphically depicts variable values in such path, and graphically depicts a sequence of methods called in the execution path. In such an exemplary embodiment, the system 100 can be comprised by an integrated development environment (IDE).

In another exemplary embodiment, the graphical data 112 can be a textual description of the execution path that satisfies the reachability query. Such textual description, for instance, can be a sequence of lines of code executed in the execution path and values of variables at such lines of code when executed in the execution path. Accordingly, the graphical data 112 can be presented in a command line interface. In another exemplary embodiment, the graphical data 112 can be depicted in a form similar as to how a step-through debugger displays graphical data. In such an exemplary embodiment, the user can cause execution of the computer executable program to execute step-by-step along the execution path identified by the path determiner component 108, such that the user can sequentially review which lines of code were executed along the execution path identified by the path determiner component 108 and values of relevant variables at such lines of code.

Figure 2:
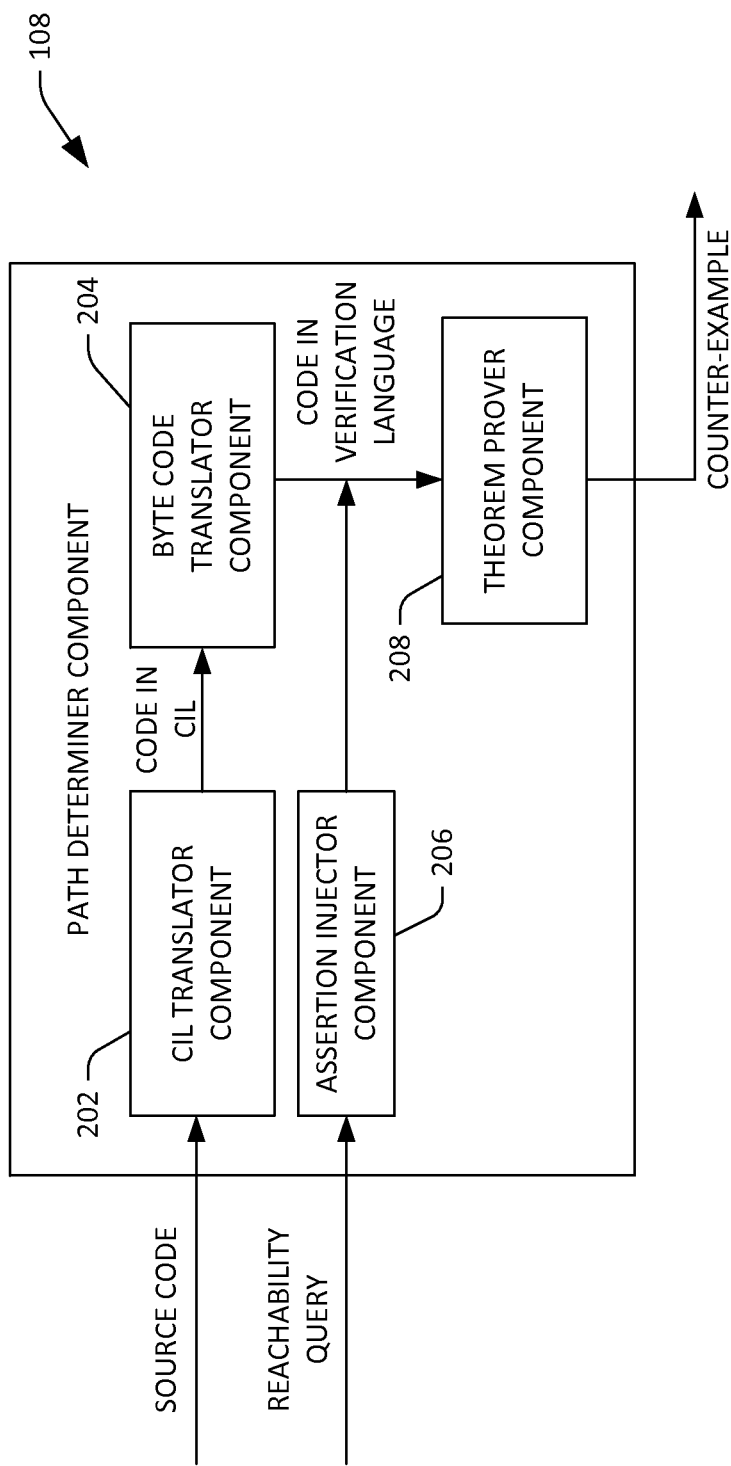
FIG. 2 is a functional block diagram of an exemplary computer-executable component that facilitates identifying an execution path that satisfies a reachability query.

With reference now to FIG. 2, an exemplary implementation of the path determiner component 108 is illustrated. The path determiner component 108 includes a common intermediate language (CI L) translator component 202 that receives the source code 104 and translates the source code 104 into code in CIL. While shown as being a translator, it is to be understood that the CIL translator component 202 can be a portion of a compiler that compiles the source code 104 into code in CIL. For instance, the source code 104 can be written in a .NET language (object oriented managed language) that compiles to CIL.

The path determiner component 108 further comprises a byte code translator component 204 that receives the code in CIL and translates such code to code in a verification language, which can also be referred to as an intermediate language. In an exemplary embodiment, the verification language can be Boogie™, which is not object-oriented, and instead of classes containing instance methods, a Boogie™ program comprises a set of global procedures, where the implicit instance reference (this) becomes an explicit parameter. The type system of Boogie™ is relatively simple, encompassing Boolean integer values and maps (arrays with an arbitrarily-typed domain). Each procedure comprises conventional program constructs: assignment statements, conditionals, and loops; everything else in the Boogie language is encoded as user-defined data types, functions, and axioms. The byte code translator component 204 encodes source language constructs, such as dynamic dispatch events and delegates as well as a model of the heap and the object type hierarchy. Thus, Boogie relies on constructs such as assert, assume, and nondeterminism for explicitly modeling source language constructs, such as dynamic dispatch, events, and control flow constructs. It can therefore be ascertained that the code in the verification language generated by the byte code translator component 204 is a global representation of the source code 104.

The path determiner component 108 additionally includes an assertion injector component 206 that injects an assertion into the code in the verification language generated by the byte code translator component 204 based at least in part upon the reachability query. The assertions injected into the code in the verification language by the assertion injector component 206 essentially asserts that execution of the computer-executable program based upon the source code 104 is impossible given the constraints set forth in the reachability query. For instance, if the reachability query includes a single conditionless end point, the assertion injector component 206 can place the statement assert false at the line of code that the user wishes to reach. The assertion injector component 206 turns all previous assertions in the code in the verification language to assumptions; an assumption places a logical constraint on a program execution.

A theorem prover component 208 receives the code in the verification language with the assertions and assumptions injected therein by the assertion injector component 206, and identifies a counter-example that proves that the assertion is false. Pursuant to an example, the theorem prover component 208 can employ a satisfiability modulo theory (SMT) solver, which is configured to reason about programs with unbounded data types, such as integers, maps, and operations, such as arithmetic, map select, update, etc. While the Boogie™ programming language supports high-level source constructs such as conditionals and loops, in an exemplary embodiment, a de-sugared form of the code in the verification language can be employed that uses just assignment, procedure call, and goto statements. The control flow induced by the conditional statements can be encoded using assume statements; Boogie's goto statements are non-deterministic. Such statements take a list of labels and may branch to any of the target blocks. Fields are represented as maps whose domain are object references, with a range that is the type of the field. Accordingly, the value of the map C.x is an integer for any object, even if its type is not C. While this is not practical when executing a program, it does not cause problems for the theorem prover component 208 when reasoning about the program.

The modified program in verification language is provided to the theorem prover component 208, which in an exemplary embodiment, can comprise Corral™, which is a whole-program analyzer for Boogie™ programs, which uses an SMT solver (Z3™) for reasoning about programs with unbounded data types such as integers and maps, and operations such as arithmetic, map select and update, etc. Generally, Corral™ converts a subset S of the program's behaviors to a Z3™ formula $\phi_S$ such that $\phi_S$ is satisfiable if and only if S includes an assertion violation. If S is insufficient, then Corral™ can issue a different query to Z3™ to either expand S or conclude that the program does not have any assertion violations. For relatively small programs (single procedure, no loops), Corral™ can pick the subset S to be the set of all program behaviors.

State changes in the computer-executable program can be encoded by having multiple incarnations of the same variable with equations linking the values between states. Incarnations are denoted with subscripts; thus $x_1$ is the value of x after being incremented from its value of $x_0$ When such formula is fed to Z3™, Z3™ attempts to locate values of a and b that satisfy the formula. Thus, the search undertaken by Z3™ for a satisfying assignment essentially corresponds to searching over all possible executions of the program.

The theorem prover component 208 can additionally operate on larger programs, for which generating a single formula is either not feasible or too expensive in terms of processing cycles or memory. In an exemplary embodiment, Corral™ can employ a heuristic where, for most programs, only a few number of variables and a few number of procedures will be relevant to the assertions in the program. Consequently, at any point in time, the subset S is defined as a pair (V, I), where V is a subset of the set of all Boogie™ variables, and I is a partially in-lined program. Initially, V is empty and I is the entry procedure of the program. Semantically, S encodes the set of all program executions that are contained in I and only reasons about variables in V, while abstracting away the rest. As the set V is increased, Corral™ gains more precision (trading off time because the formulas needed to analyze the programs becomes more complicated). When I rises (e.g. more procedures are inlined), then the syntactic scope of Corral™ increases and it can find longer counterexamples.

In an exemplary embodiment, the code in the verification language can be a Turing-complete language, such that the problem of finding assertion violations in the verification language is undecidable. Therefore, it is possible that the expansion of S inside Corral™ can extend indefinitely. To counter non-termination, a bound can be imposed on I (the set V is always bounded by the set of all global variables in Boogie™, which is a finite number). This bound limits the number of loop iterations and recursive calls.

Since the assertion injector component 206 injected a false assertion at the destination line of code, when Corral™ produces a counter-example, such counter-example must be a trace that finishes at the specified destination line of code from the reachability query. The counter-example reported by Corral™ can include a trace in the Boogie™ program along with valuables at various points in the trace. Such trace can be translated into one that corresponds to the language in which the source code 104 is written.

```
Trace      :=   Statement*
Statment   :=   call MethodName
                |   location File, LineNumber
                |   state {Name ↦ Value}
                |   return
Name       :=   Identifier | Address
Value      :=   int Integer
                |   bool Boolean
                |   fieldmap {Identifier ↦ Value}
                |   arraymap {Integer ↦ Value}
                |   ref Address
```

The call and return statements form a call tree, location indicates that the program executed the source code at the given location, and state describes a symbolic heap at the most recent location. The state map assigns values to local variables, global variables, and symbolic addresses that represent sharing and cycles in the heap graph. For example, if two local variables x and y both refer to an object with integer field f with value 3, then the state map contains {x→ref $a_0$, y→ref $a_0$, $a_0$→fieldmap{f→3}}.

While the description set forth above indicates that a combination of Boogie™, Corral™, and Z3™ can be employed as the theorem prover component 208, it is to be understood that the theorem prover component 208 can include any suitable theorem prover technology.

Figure 3:
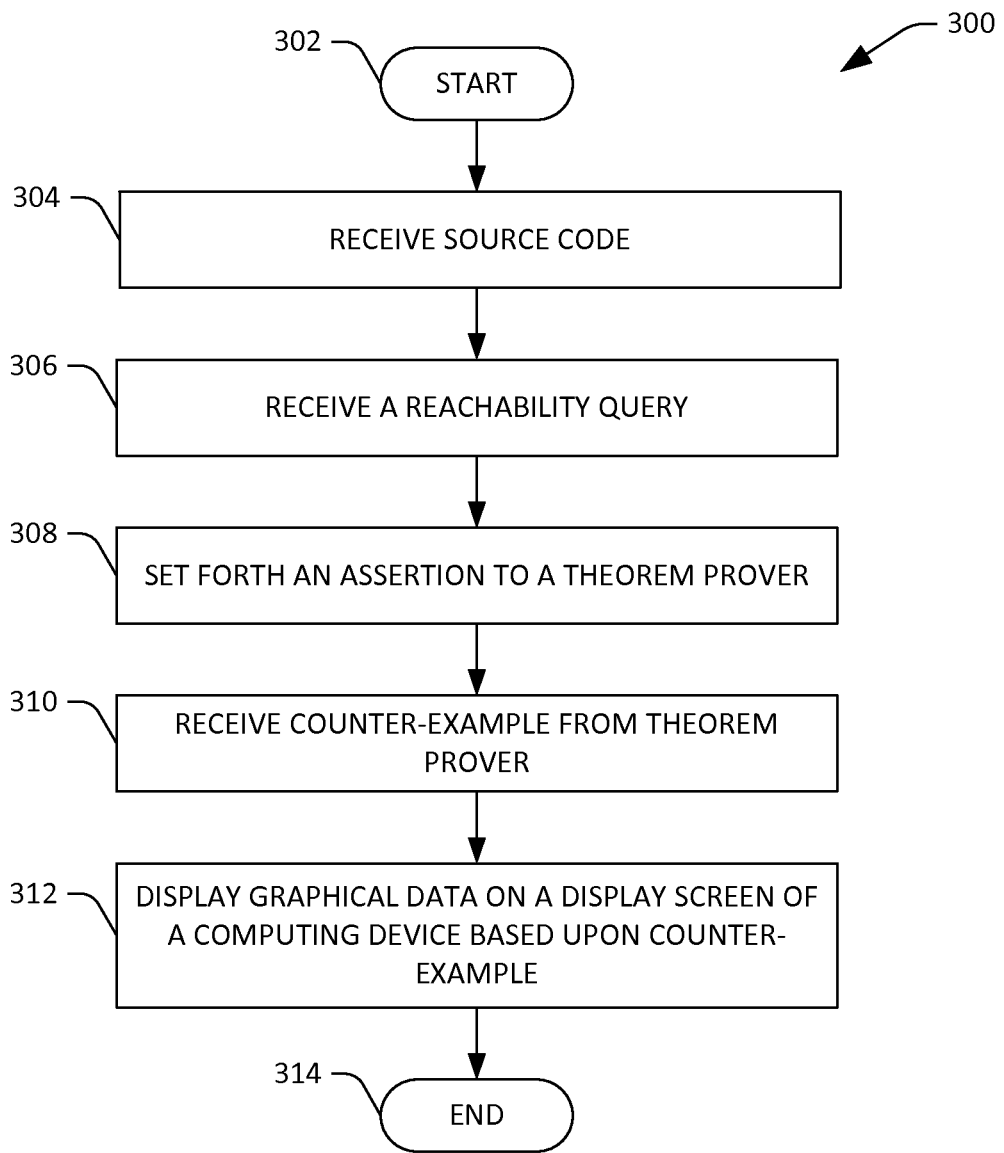
FIG. 3 is a flow diagram that illustrates an exemplary methodology that facilitates answering a reachability query set forth by user with respect to a computer-executable program.
Figure 4:
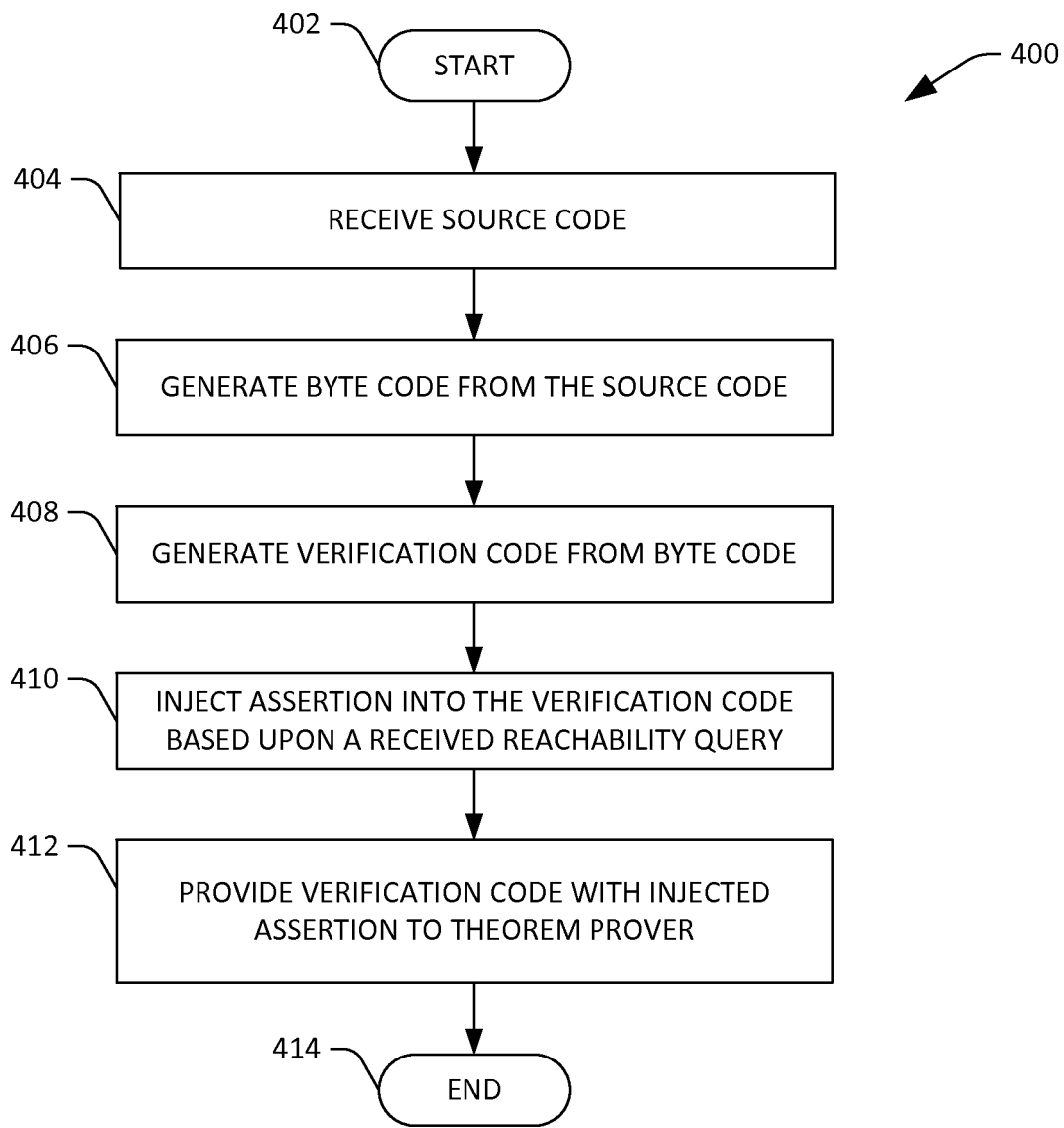
FIG. 4 is a flow diagram that illustrates an exemplary methodology for identifying an execution path through source code that satisfies a reachability query.

With reference now to FIGS. 3-4, exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring solely to FIG. 3, an exemplary methodology 300 that facilitates answering a reachability query set forth by a user is illustrated. The methodology 300 starts at 302, and at 304 source code for a computer-executable program is received. As mentioned above, the source code comprises a plurality of lines of code, wherein the plurality of lines of code comprises statements that define values of variables and a plurality of branches. Execution paths are taken during execution of the computer-executable program by a computer processor based at least in part upon respective values of the variables. In an exemplary embodiment, the source code can be a relatively large portion of source code; between 1,000 and 100,000 lines.

At 306, a reachability query is received, wherein the reachability query comprises a user specification of a destination line of code from amongst the plurality of lines of code of the source code. In an exemplary embodiment, the reachability query can be specified through graphical interaction with the source code (e.g., in an IDE). In another exemplary embodiment, the reachability query can be a natural language query, a Boolean query, or the like.

At 308, an assertion is set forth for a computer-executable theorem prover. The assertion indicates that the destination line of code specified in the reachability query is unreachable during execution of the program.

At 310, a counter-example is received from the theorem prover, wherein the counter-example is a trace that identifies an execution path that reaches the destination line of code specified in the reachability query received at 306. The counter-example can further include a value of at least one variable in the variables that causes the program to reach the destination line of code specified in the reachability query by way of the execution path.

At 312, graphical data is displayed on a display screen of a computing device based at least in part upon the counter-example, wherein the graphical data comprises an indication of the execution path in the value of the at least one variable. The methodology 300 completes at 314.

Now referring to FIG. 4, an exemplary methodology 400 that facilitates setting forth a counter-example to an assertion injected in verification code is illustrated. The methodology 400 starts at 402, and at 404 source code is received. At 406, byte code is generated based at least in part upon the source code. At 408, verification code is generated based at least in part upon the byte code.

At 410, an assertion is injected into the verification code based upon a received reachability query. Additionally, an assumption can be injected into the verification code. At 412, a theorem prover is provided with the verification code that includes the injected assertion. The theorem prover may then provide a counter-example, which is a trace that includes reaching of the destination line of code in accordance with constraints set forth in the reachability query. The methodology 400 completes at 414.

Figure 5:
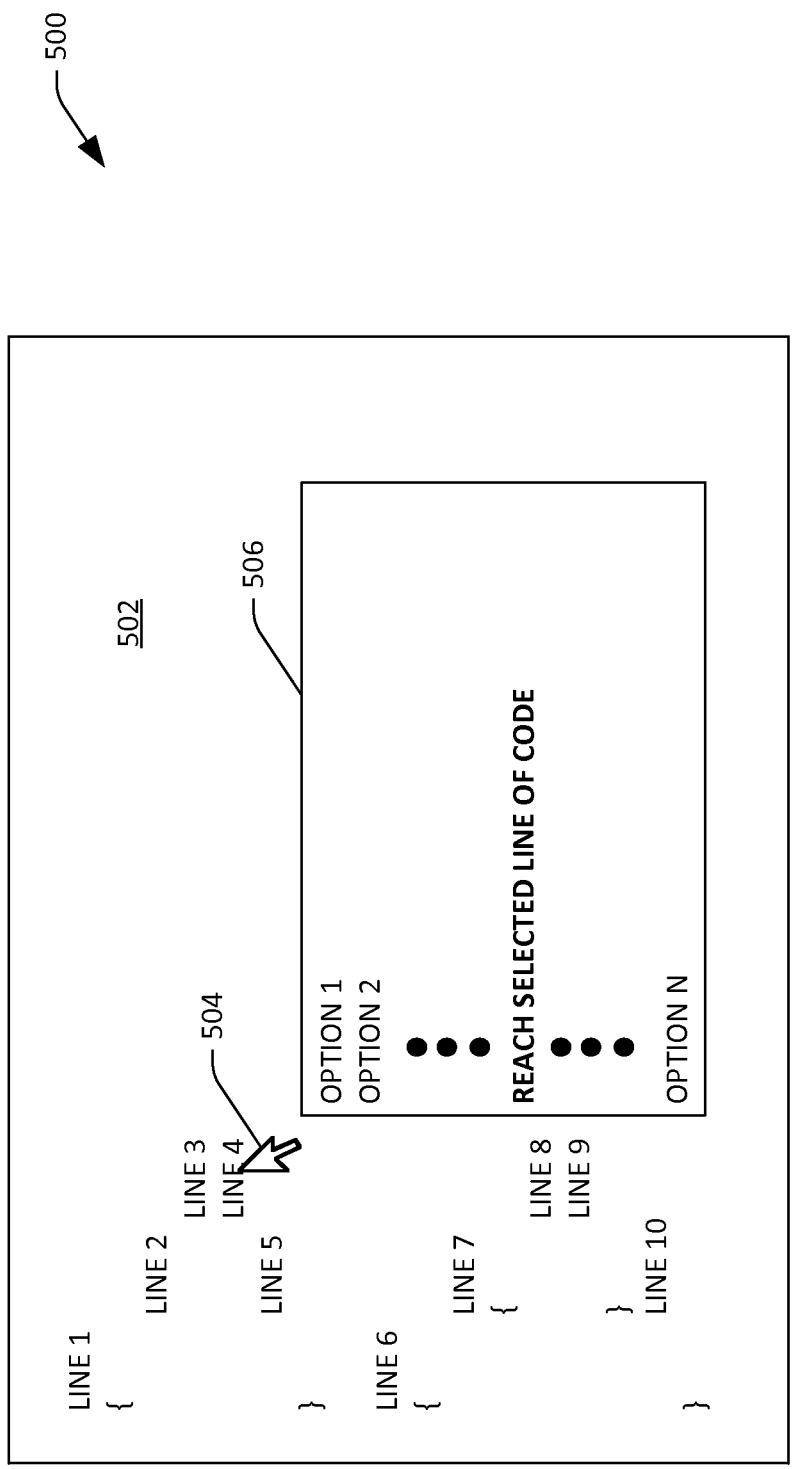
FIG. 5 is an exemplary graphical user interface that facilitates specifying a reachability query.

Turning now to FIG. 5, an exemplary graphical user interface 500 that facilitates specification of a reachability query is illustrated. The graphical user interface 500 comprises a source code viewing region 502, which includes lines of source code that can be viewed/edited by a developer. While not shown, the viewing region 502 can include slide bars that allow a viewer of the viewing region 502 to relatively quickly view different portions of source code.

The user can select a line of the source code of interest through, for instance, a cursor 504 and a mouse. For instance, the user can position the cursor 504 over the line of code of interest and right click the mouse, which can cause a menu 506 to be displayed. In another exemplary embodiment, the user can select the line of code through a touch sensitive display mechanism, through voice commands, or the like. Responsive to the user selecting the line of code of interest, the menu 506 is presented, wherein the menu 506 includes a plurality of selectable options. One of such options can be to identify the selected line of code as the destination line of code mentioned above. For instance, if the user positions the cursor 504 over the option to reach the selected line of code, this can cause a reachability query to be generated such that an execution path is identified that reaches the selected line of code.

Figure 6:
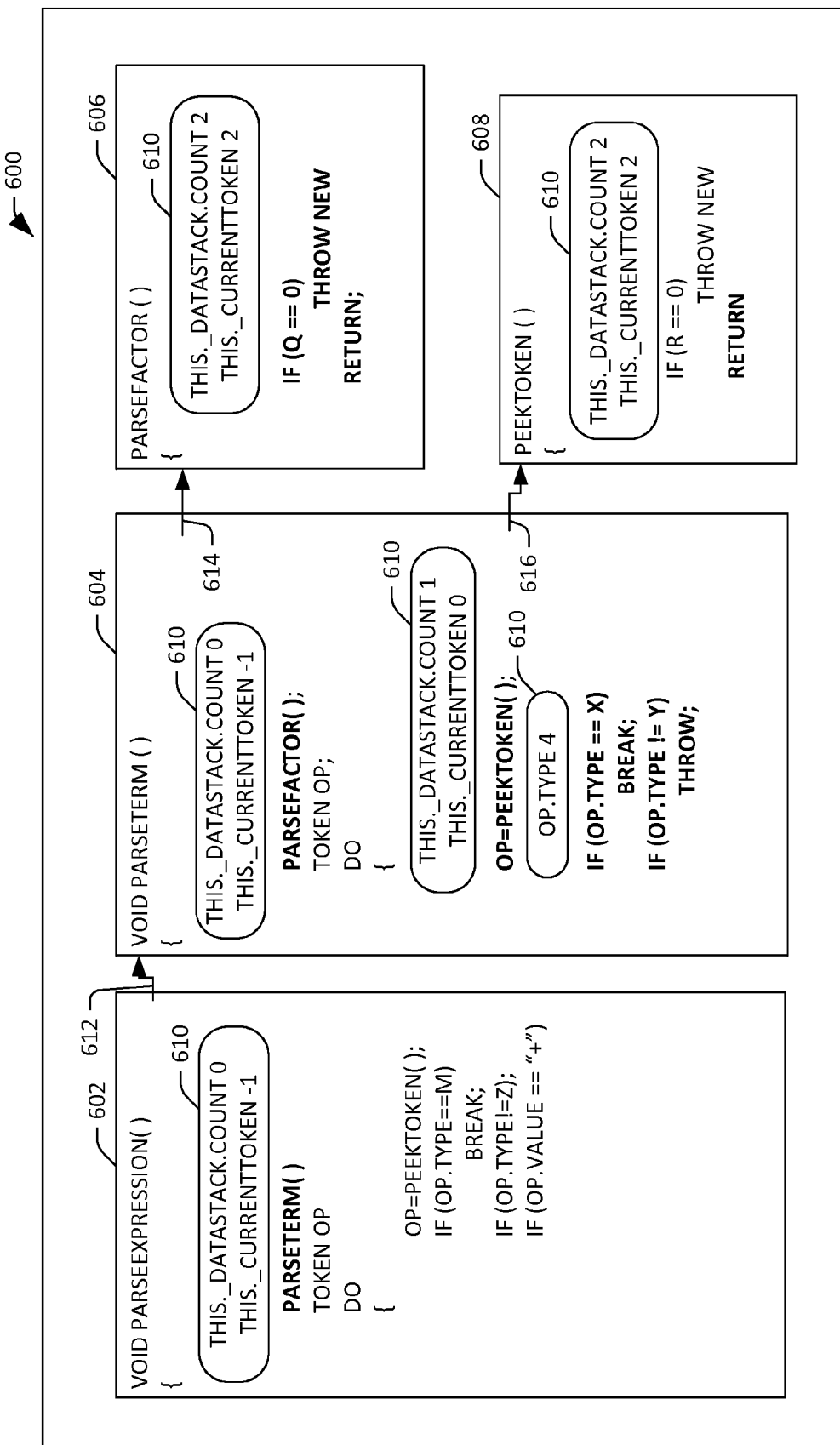
FIG. 6 is an exemplary graphical user interface depicting graphical data presented to a user that illustrates an execution path taken through source code that satisfies a reachability query set forth by the user.

Now referring to FIG. 6, an exemplary graphical user interface 600 that depicts an execution path that satisfies a reachability query is illustrated. The graphical user interface 600 comprises a plurality of code bubbles 602-608, wherein each of the code bubbles 602-608 represents a respective method called/executed along an execution path that satisfies the reachability query. Thus, the first code bubble 602 represents a first method called/executed in the execution path, the second code bubble 604 represents a second method called/executed in the execution path, the third code bubble 606 represents a third method called/executed in the execution path, and the fourth code bubble 608 represents a fourth method called/executed in the execution path.

In each code bubble, respective lines of code that are executed can be highlighted. As shown in the graphical user interface 600, lines of code executed are displayed in bold type to visually differentiate such lines from lines of code that are not executed in the execution path. Other mechanisms for visually differentiating executed lines of code versus non-executed lines of code in the execution path are contemplated, including highlighting, altering font, and the like. In another embodiment, non-executed lines of code can be omitted from display.

Each code bubble can further comprise respective graphical data that indicates values of variables in the execution path. Such values are collectively shown by reference numeral 610. Additionally, the graphical user interface 600 can comprise arrows 612-616 that represent direct method calls and indirect method calls; for instance, solid arrows can be employed to represent direct method calls, while dashed arrows can be employed to represent indirect method calls (for example due to events).

The graphical user interface 600 can additionally be modified to depict further information. For instance, in a method body, a trace identified by the theorem prover component 208 can specify the order in which statements are executed and interleaved with outgoing calls. Thus, the graphical user interface 600 can be configured to illustrate an order of statement execution. Additionally, the graphical user-interface 600 can be modified to accommodate loops such that a timeline slider can be added to allow the user to witness an order of execution.

Figure 7:
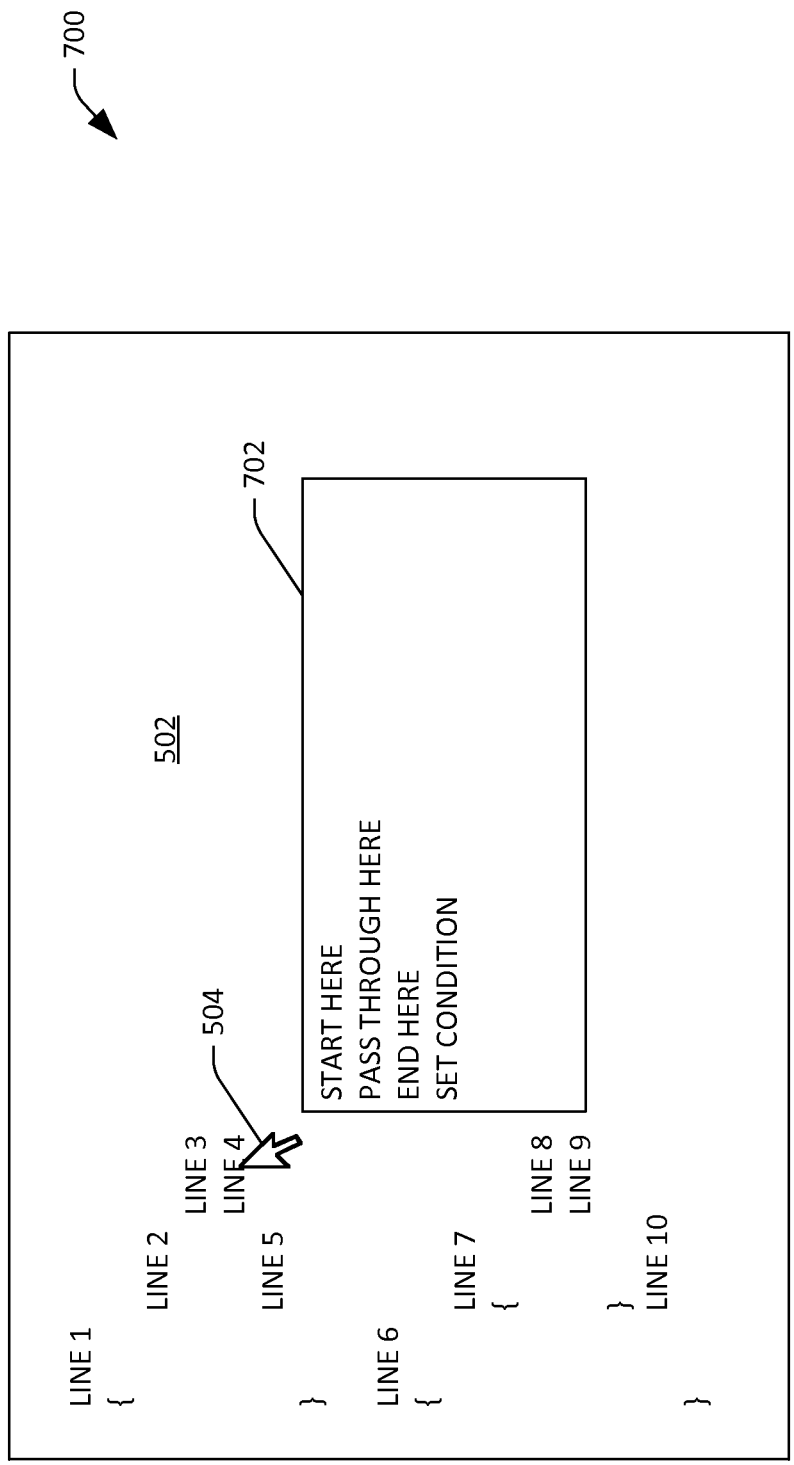
FIG. 7 is an exemplary graphical user interface that facilitates setting forth a reachability query.

Now referring to FIG. 7, another exemplary graphical user-interface 700 that facilitates specification of a reachability query is illustrated. The graphical user interface 700 comprises the viewing region 502. Again, the user can select a particular line of code through utilization of the cursor 504 or other suitable selection mechanism, which can cause a menu 702 to be presented to the user. Such menu 702 can include a plurality of selectable options which pertain to specifying a reachability query. For instance, the menu 702 can include a first selectable option that allows the selected line of code to be identified as the initial line of code, such that execution of the program is to start at the selected line of code (optionally with some defined variable values). A second option can cause the selected line of code to be an intermediate line of code such that the execution path is restricted to pass through the selected line of code prior to reaching the destination line of code. Further, the user can specify an order in which lines of code are to be reached in the execution path. While not shown, this can be graphically depicted through numbers assigned to the line of code, letters assigned to the line of code, etc. Supporting the specification of intermediate lines of code can be useful given that the static analysis of the code relies on a theorem prover, which may be an SMT solver. In such an embodiment, the theorem prover is free to choose any counter-example, which means that the theorem prover can select any execution trace that reaches an endpoint. Such endpoint may be the choice of the theorem prover but not desirable for analysis purposes from the perspective of the user. Accordingly, allowing the user to specify a query that finds intermediate pointing conditions allows the user to search iteratively for a trace that is preferable to the user. For instance, if the user is provided with a trace that takes a normal path through a method, and the user prefers to see an exceptional path, the user can place an intermediate point inside, for instance, a catch statement. Similarly, if the theorem prover sets forth a counter-example in which an environment variable has a value of x and the user prefers the value of y, the user can set a conditional waypoint at the line of code where that environment variable is read.

The menu 702 may also include an option that allows the user to specify the selected line of code as the destination line of code as described above. Furthermore, the menu 702 can include a selectable option that allows the user to specify a condition such as a variable value, etc.

With reference now to FIG. 8, an exemplary user interface 800 that is illustrative of an exemplary implementation of the graphical data 112 in a command line interface is shown. In such an example, the execution path taken is shown as specified lines of code executed in an order, with pertinent variable values corresponding thereto shown adjacent to the lines of code. The user can walk through the lines of code executed in the execution path and see conditions that cause the code to execution along the execution path. As mentioned above, this can also be shown in a debugging mode, wherein execution lines can be sequentially presented upon receiving input from the user (depression of an enter key).

Figure 9:
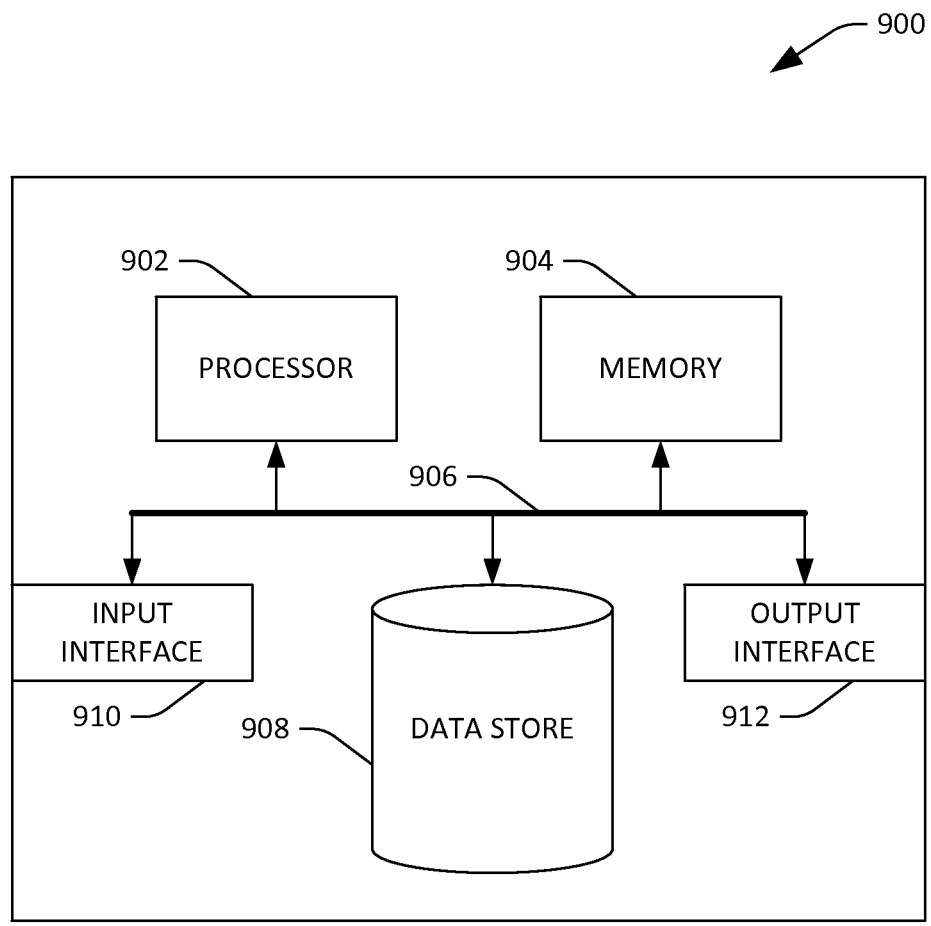
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports answering a reachability query set forth by a user. In another example, at least a portion of the computing device 900 may be used in a system that supports generating a graphical user interface that graphically depicts an execution path that answers a reachability query set forth by a user. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store graphical data, etc.

The computing device 900 additionally includes a data store 908 that is accessible by the processor 902 by way of the system bus 906. The data store may be or include any suitable computer-readable storage, including a hard disk, memory, etc. The data store 908 may include executable instructions, graphical data, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computer-implemented method comprising:
receiving source code for a computer-executable program, the source code comprising a plurality of lines of code, the plurality of lines of code comprising statements that define values of variables and a plurality of execution paths, wherein respective execution paths are taken during execution of the computer-executable program by a computer processor based at least in part respective values of the variables;
receiving a reachability query from a user, the reachability query comprising:
a user-selected initial line of code from amongst the plurality of lines of code;
a user-selected intermediate line of code from amongst the plurality of lines of code; and
a user-selected destination line of code from amongst the plurality of lines of code;
responsive to receiving the reachability query, identifying:
an execution path in the plurality of execution paths that begins at the initial line of code, then reaches the intermediate line of code, and subsequently reaches the destination line of code; and
a value of at least one variable in the variables that causes the program to execute over the execution path; and
displaying graphical data on a display screen of a computing device, the graphical data indicative of the execution path and the value of the at least one variable.

2. The method of claim 1, wherein the graphical data is displayed in an integrated development environment graphical user interface.

3. The method of claim 2, the execution path comprises a first method, followed by a second method, followed by a third method, the first method calls the second method, the second method calls the third method, the graphical data comprises a graphical representation of the first method, a graphical representation of the second method, and a graphical representation of the third method, the graphical data further comprises an indication that the execution path comprises execution of the first method, the second method, and the third method in sequence.

4. The method of claim 1, the method of claim 1, wherein the graphical data is displayed in a command line interface.

5. The method of claim 1 configured for execution in a debugger, wherein portions of the graphical data are sequentially displayed responsive to respective commands from the user.

6. The method of claim 1, wherein the source code is written in one of C# or C programming language.

7. The method of claim 1, wherein the reachability query comprises a constraint on the value of the at least one variable.

8. The method of claim 1, wherein the source code comprises between one thousand and one hundred thousand lines of code.

9. The method of claim 1, wherein the reachability query is expressed as a natural language query.

10. The method of claim 1, wherein the reachability query is expressed as a Boolean query.

11. The method of claim 1, wherein identifying the execution path comprises:
setting forth an assertion to a computer-executable theorem prover that the destination line of code specified in the reachability query is unreachable; and
receiving from the theorem prover a counter-example, the counter-example comprising the execution path.

12. The method of claim 11, further comprising generating a global representation of the computer program in formulaic code based at least in part upon the source code, wherein the theorem prover is provided with the formulaic code and generates the counter-example based upon the formulaic code and the assertion.

13. The method of claim 1, wherein identifying the value of the at least one variable comprises:
setting forth an assertion to a computer-executable theorem prover that the destination line of code specified in the reachability query is unreachable; and
receiving from the theorem prover a counter-example, the counter-example comprising the value of the at least one variable.

14. A system comprising:
a computer processor; and
a memory that comprises a plurality of components that are executed by the processor, the plurality of components comprising:
a query receiver component that receives a reachability query, the reachability query comprising:
a user-selected initial line of code in source code of a computer-executable program;
a user-selected intermediate line of code in the source code of the computer-executable program; and
a user-selected destination line of code in the source code of the computer-executable program, the source code comprising a plurality of lines of code and a plurality of potential execution paths therethrough;

a path determiner component that identifies an execution path from amongst the plurality of potential execution paths that begins at the initial line of code, passes through the intermediate line of code, and subsequently reaches the destination line of code, the path determiner component further identifying a value of at least one variable in the computer-executable program that at least partially causes the execution path to be taken during execution of the computer-executable program; and a visualizer component that generates graphical data for display on a display screen of a computing device, the graphical data depicting the execution path.

15. The system of claim 14, wherein the plurality of components are comprised by an integrated development environment.

16. The system of claim 14, wherein the plurality of components are comprised by a debugger.

17. The system of claim 14, wherein the plurality of components are comprised by a command line interface.

18. The system of claim 14, wherein the path determiner component comprises a theorem prover that outputs a trace that identifies the execution path.

19. A computer-readable medium comprising instructions that, when executed by a processor, cause the processor to perform acts comprising:

receiving source code of a computer-executable program, the source code comprising a plurality of lines of code, the source code comprising a plurality of potential execution paths therethrough;

receiving a reachability query, the reachability query comprising a user-selected initial line of code, a user-selected intermediate line of code, and a user-selected destination line of code;

responsive to receiving the reachability query, identifying an execution path in the plurality of execution paths that begins at the user-selected initial line of code, then reaches the intermediate line of code, and subsequently reaches the destination line of code; and displaying graphical data on a display screen of a computing device, the graphical data depicting the execution path and at least one value for at least one variable corresponding to the execution path.

20. The computer-readable medium of claim 19, wherein identifying the execution path in the plurality of execution paths comprises:

setting forth an assertion to a computer-executable theorem prover that the destination line of code specified in the reachability query is unreachable; and receiving from the theorem prover a counter-example, the counter-example comprising the execution path.

* * * * *